United States Patent [19]

Konzak

[11] Patent Number: 4,598,660

[45] Date of Patent: Jul. 8, 1986

[54] BIRD SCARING DEVICE

[76] Inventor: Peter Konzak, Box 547, Devils Lake, N. Dak. 58301

[21] Appl. No.: 594,858

[22] Filed: Mar. 29, 1984

Related U.S. Application Data

[63] Continuation-in-part of Ser. No. 499,696, May 31, 1983, which is a continuation-in-part of Ser. No. 388,040, Jun. 14, 1982, abandoned.

[51] Int. Cl.⁴ .................. G08B 15/00; G09F 19/08
[52] U.S. Cl. ................................. 116/22 A; 116/23; 446/180; 446/199; 446/310; 40/412
[58] Field of Search .................. 40/411–417, 40/477, 479, 421, 422, 439, 465, 561, 902; 73/189; 116/4, 22 A, 23, 67 R, 137 R, 274, 282; 124/1, 55, 77; 188/282, 297, 299–301; 273/1 R, 349, 378, 384, 385; 446/89, 308–314, 180, 199; 52/101; 74/126, 127; 250/214 AL

[56] References Cited

U.S. PATENT DOCUMENTS

| | | | |
|---|---|---|---|
| 764,759 | 7/1904 | Owen | 73/189 |
| 966,950 | 8/1910 | Puha | 116/22 A |
| 1,070,799 | 8/1913 | Grisell | 16/66 |
| 1,167,502 | 1/1916 | Peck | 116/22 A |
| 1,883,028 | 8/1931 | Smith | 141/162 |
| 1,883,029 | 10/1932 | Smith | 162/151 |
| 1,908,070 | 5/1933 | Smith | 42/55 |
| 2,049,360 | 7/1936 | Erickson | 40/413 |
| 2,094,854 | 10/1937 | Smith | 42/55 |
| 3,113,304 | 12/1963 | Lindley | 116/22 A |
| 3,244,888 | 4/1966 | Armstrong et al. | 250/214 AL |
| 3,572,309 | 7/1967 | DeFreitas | 124/11 |
| 3,633,560 | 1/1972 | DeFreitas | 124/11 |
| 4,074,653 | 2/1978 | Pember | 116/22 A |
| 4,238,002 | 12/1980 | Hexamer | 74/127 |
| 4,325,014 | 4/1982 | Jeck | 73/189 |

FOREIGN PATENT DOCUMENTS

| | | | |
|---|---|---|---|
| 484592 | 10/1929 | Fed. Rep. of Germany | 46/145 |
| 814536 | 9/1951 | Fed. Rep. of Germany | 116/22 A |
| 1278171 | 9/1968 | Fed. Rep. of Germany | 116/22 A |
| 2257570 | 6/1974 | Fed. Rep. of Germany | 116/22 A |
| 346641 | 11/1978 | Fed. Rep. of Germany | 116/22 A |
| 2900284 | 7/1980 | Fed. Rep. of Germany | 116/22 A |

Primary Examiner—Charles E. Frankfort
Assistant Examiner—W. Morris Worth
Attorney, Agent, or Firm—Cushman, Darby & Cushman

[57] ABSTRACT

A device for scaring birds thereby aiding in the prevention of crop destruction due to the birds feeding thereon comprises in combination an actuator, such as an air gun which ejects at increased velocity a gaseous stream in a predetermined path, a frame including a target disposed in an impinging relationship to the gaseous stream path so as to be moved between rest and operative positions responsive to the gaseous stream, and visual scaring member operatively connected to the target for scaring birds, the visual member being reciprocally operable between inactive and active positions in response to the target being moved between the rest and operable position, respectively. According to another embodiment of the present invention, automatic controls are provided for disabling the device during night hours and/or during periods of increased wind velocities which could potentially damage the device. Conversion of linear motion into rotary motion is provided by operative cooperation between guide rollers mounted to the piston of the visual member and a spiral track which is in fixed relationship to the visual member.

10 Claims, 13 Drawing Figures

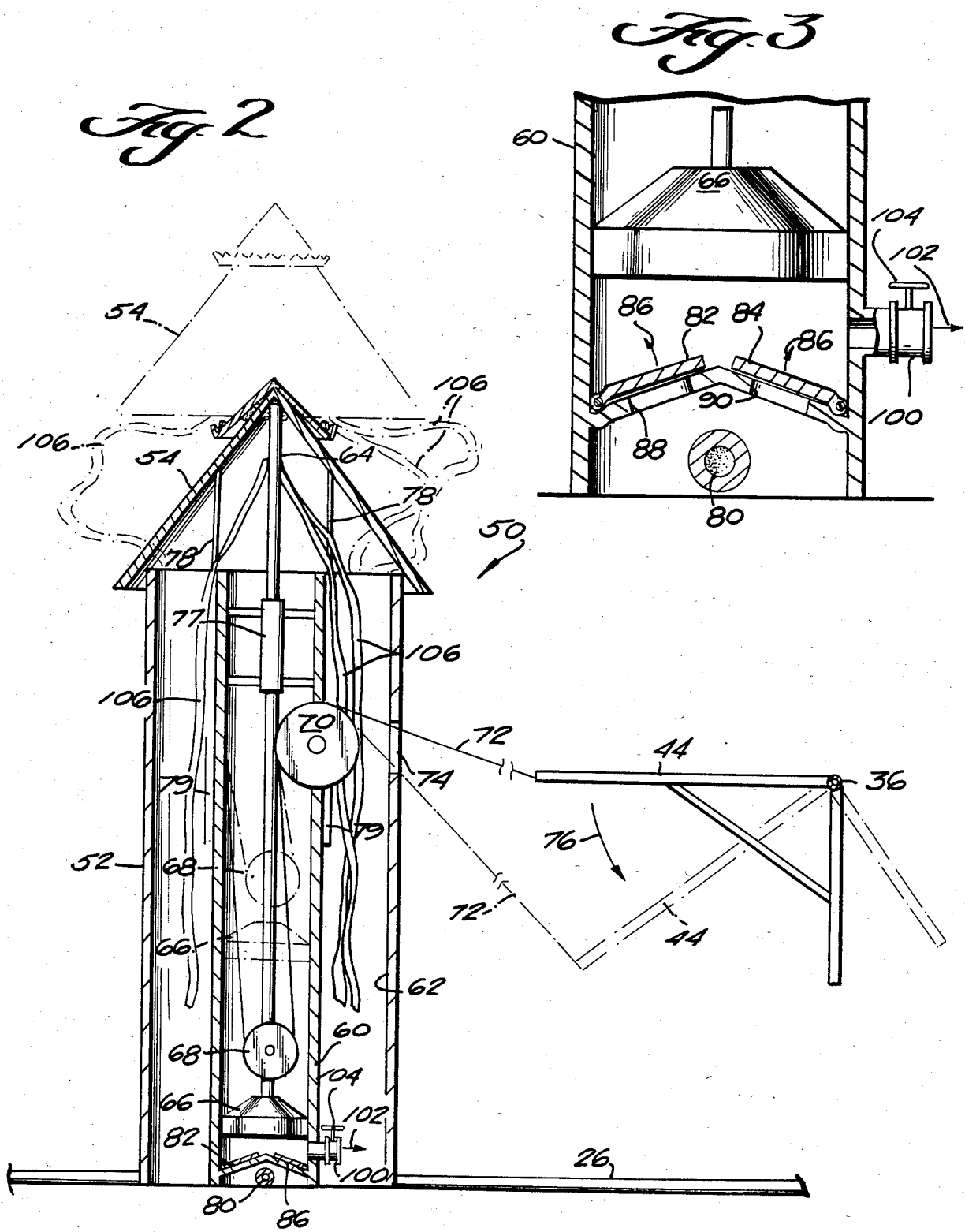

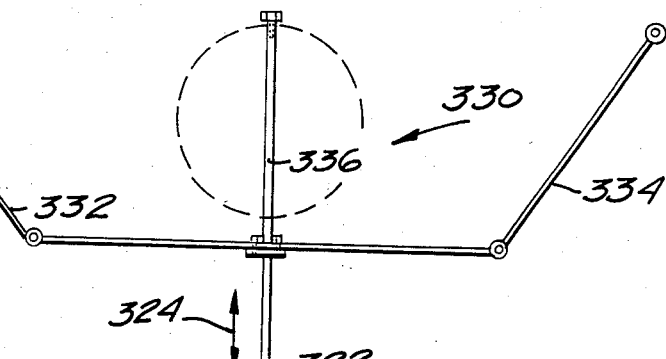
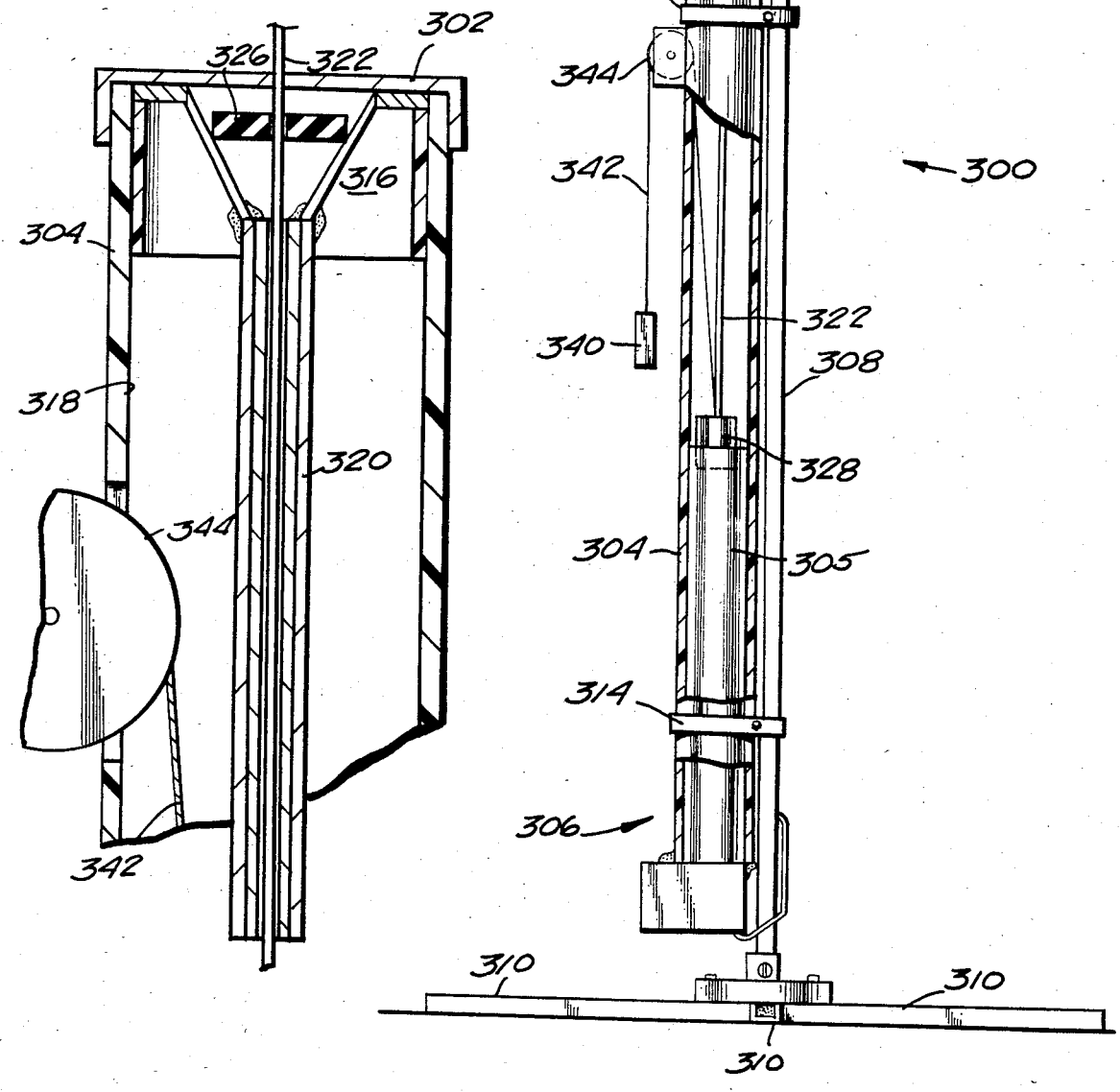

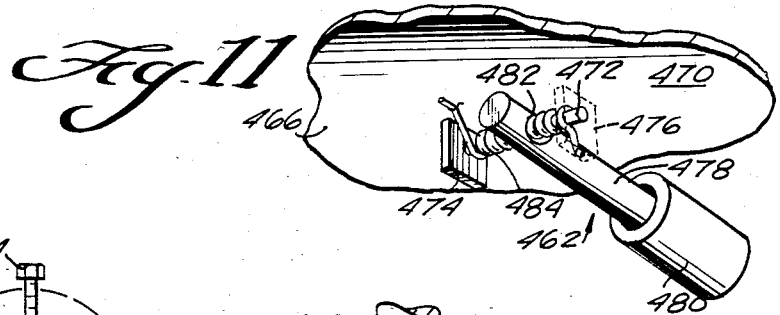
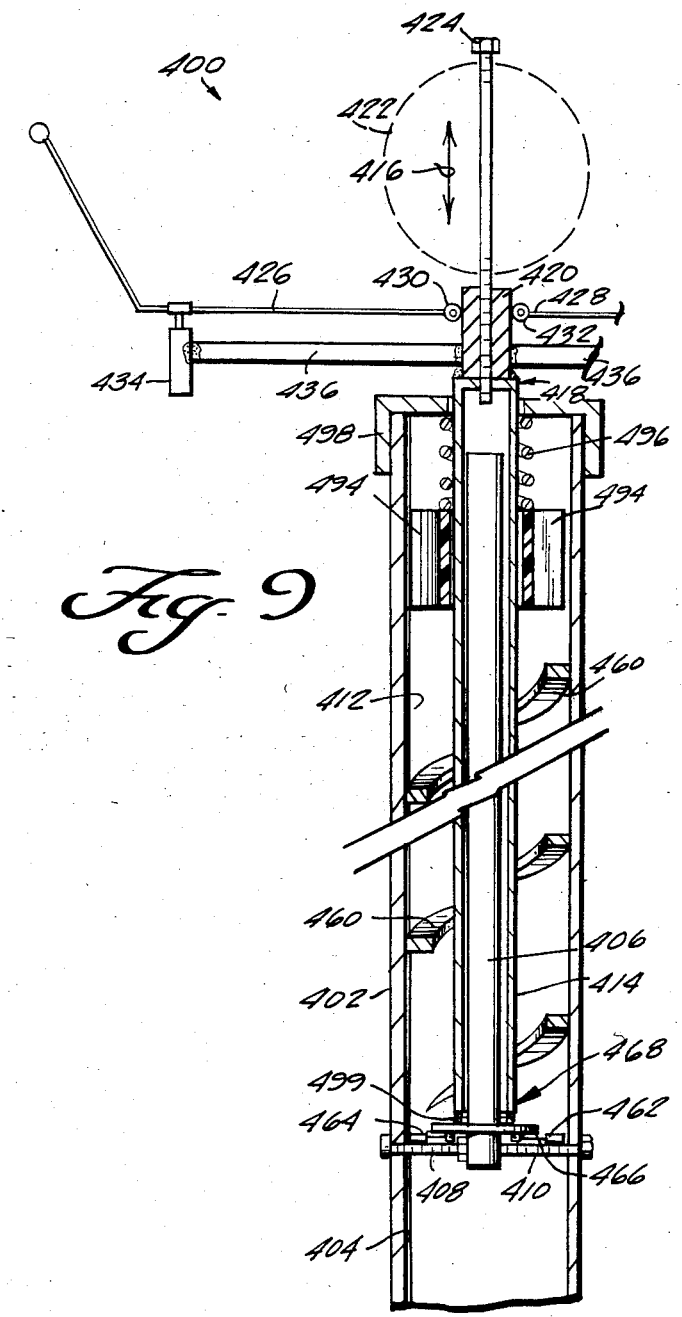
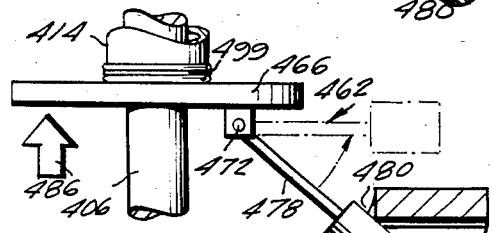
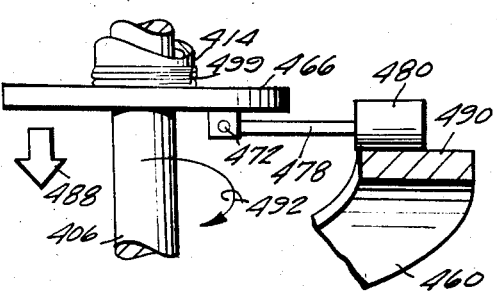
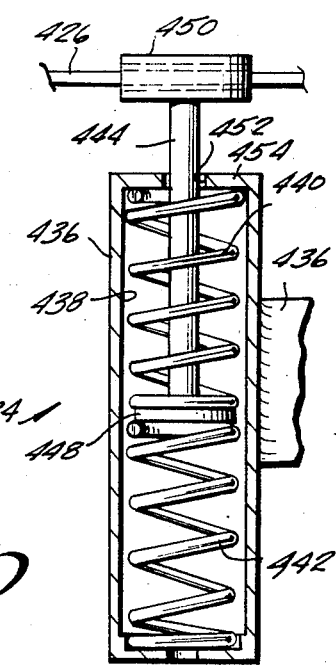

BIRD SCARING DEVICE

CROSS REFERENCE TO RELATED APPLICATIONS

This application is a continuation-in-part of my copending U.S. application Ser. No. 499,696 filed May 31, 1983 which in turn is a continuation-in-part of copending U.S. application Ser. No. 388,040 filed June 14, 1982, now abandoned each of which is entitled "BIRD SCARING DEVICE".

BACKGROUND AND SUMMARY OF THE INVENTION

The present invention generally relates to a novel device which can be successfully utilized by farmers to prevent the destruction of their crops due to birds feeding thereon. More particularly, the present invention relates to a device which scares birds and preferably causes their flight from a crop field so that their feeding habits are interrupted thereby preventing crop destruction.

The destruction of cash crops by birds feeding upon them is, of course, a well-known problem to farmers or other food producers. One of the earliest devices which man proposed for preventing the destruction of his crops from birds feeding thereon was the scarecrow. A scarecrow is, of course, a crude figure of a man which is placed in a field to scare or frighten birds from growing crops. However, the scarecrow suffers from an inherent disadvantage in that it is inanimate in nature and therefore, often times fails to perform its intended function.

It has also been proposed to utilize a loud audible noise so as to frighten birds from growing crops. Such an audible noise normally eminates from an air gun of the type which utilizes a combustible gas as a fuel source. The air gun ignites the combustible gas at predetermined time intervals thereby producing a loud noise. The loud noise associated with such air guns was initially successful in preventing birds from feeding upon cash crops. However, due to the air gun's widespread use, more and more birds have become accustomed to the periodic firing of the gun and therefore, the loud noise no longer startles a vast majority of birds. A typical air gun of the type conventionally in widespread use today is exemplified by the ones distributed by the Reed-Joseph International Company, Greenville, Miss. 38701, under the tradename "M-4 SCARE-AWAY".

Further examples of air guns utilized for scaring birds are disclosed in U.S. Pat. Nos. 3,572,309 and 3,633,560.

As mentioned above, the conventional air gun which utilizes noise to scare birds from feeding upon cash crops, while initially effective, has grown decreasingly effective through the years. Accordingly, the problem of crop destruction has remained and those who produce food have constantly endeavored to develop improved means for scaring birds in order to prevent wholesale destruction of cash crops.

The present invention is directed to the problem of crop destruction inflicted by the feeding habits of birds. The present invention presents a novel and distinct advance in the art of scaring birds from growing crops in that not only is an audible signal utilized, but an animate, visual signal is also utilized in combination therewith.

The present invention preferably utilizes an air gun actuator which is, in and of itself, well known in the art. The preferred air gun actuator utilized according to the present invention is of the type which ejects a stream of gases at increased velocity from a barrel and which also emits a loud noise so as to startle birds. The present invention utilizes the conventional air gun in combination with an animate, visual signal which is activated responsively to the stream of gases emitted by the air gun. Thus, not only is an audible loud noise emitted according to the present invention, but an animate, visual signal is provided to enhance the effectiveness of scaring birds feeding upon cash crops.

Other objects and advantages of the present invention will become more clear to those in the art after careful consideration is given to the detailed description of the preferred exemplary embodiment which follows.

BRIEF DESCRIPTION OF THE DRAWINGS

Reference will hereinafter be made to the accompanying drawings wherein like reference numerals throughout the various figures denote like structural elements and wherein:

FIG. 2 is a cross-sectional elevational view of the animate, visual portion of the embodiment depicted in FIG. 1;

FIG. 3 is a detail cross-sectional view of the piston arrangement utilized according to the present invention;

FIG. 7 is an elevational view, partly in section, of another embodiment of the bird scaring device in accordance with the present invention;

FIG. 8 is a detailed cross-sectional view of the upper portion of the FIG. 7 embodiment;

FIG. 9 is an elevational view, partly in section of another embodiment of the present invention;

FIG. 10 is a detailed elevational view of a motion damper for use in the present invention to damp motion transmitted to the arms thereof;

FIG. 11 is a bottom perspective view of a guide roller particularly suited for use in the FIG. 9 embodiment; and FIGS. 12a and 12b are schematic elevational illustrations of the functioning of the FIG. 10 guide roller when the device of the FIG. 9 embodiment is operated.

DETAILED DESCRIPTION OF THE PREFERRED EXEMPLARY EMBODIMENTS

Figure 1:
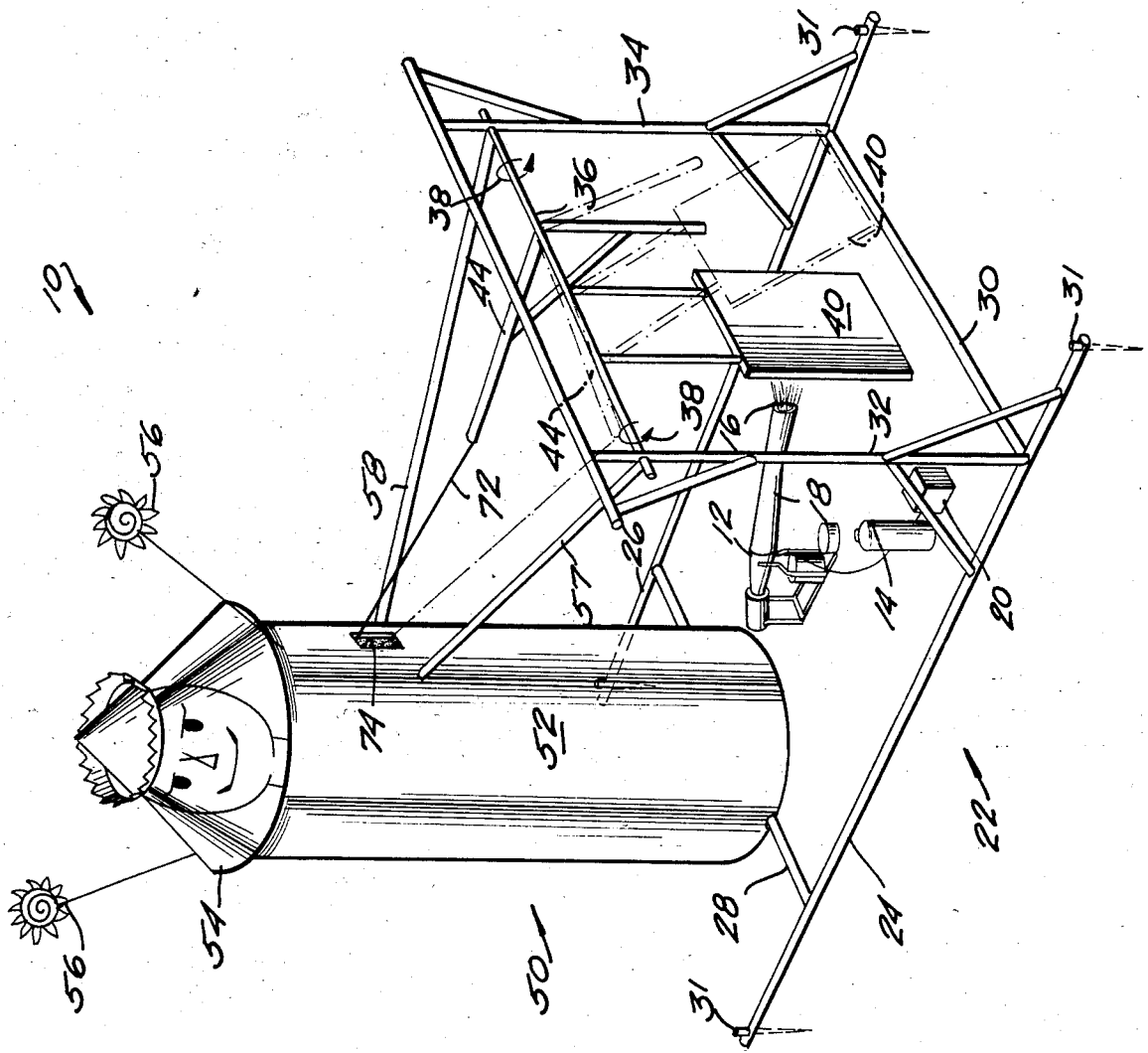
FIG. 1 is a perspective view of a preferred exemplary embodiment of the bird scaring device according to the present invention.

Generally, the component parts of the bird scaring device 10 according to a preferred embodiment of the present invention can be seen in more detail by referring to FIG. 1. The device 10 generally comprises an air gun 12 of the type utilizing a combustible fuel source 14 which supplies combustible fuel to gun 12. Upon ignition of the combustible fuel, gun 12 will emit a stream of gases 16 from barrel 18 at increased velocities. Air gun 12 can be provided with a timer 20 to provide periodic ignition of the combustible gas so as to cause periodic loud audible sounds from the air gun 12 in addition to periodic emission of gas stream 16.

Preferably, air gun 12 centrally disposed relative to a frame 22. Frame 22 generally includes parallel horizontal base members 24, 26 separated by cross support members 28, 30. Members 24, 26, 28 and 30 are adapted to being secured against the ground via stakes 31 thereby supporting the other components of the device 10 as will be more fully described hereinafter. Vertical supports 32, 34 are rigidly attached to horizontal members 24, 26. Between vertical supports 32, 34, there is journalled a cross support member 36 so that journalled movement (arrows 38) can be effected.

Dependently supported by cross support member 36 is a target plate 40 which has a surface disposed in the path of gas stream 16 emitted from air gun 12. Thus, gas stream 16 will impinge upon a surface of target plate 40 and, due to the increased velocity of gas stream 16, target plate 40 will swing outwardly relative to air gun 12 by virtue of the journalled mounting of cross support member 36 (the extent of responsive movement of target plate 40 is noted generally by phantom line in FIG. 1). Lever member 44 is rigidly attached to cross support member 36 and, therefore, responsively moves with target plate 40 when gas stream 16 impinges thereon.

The animate, visual scaring portion 50 generally comprises an enclosure 52 which houses the operable mechanisms thereof and a cap 54 which can be decorated with a suitable facsimile of a human face, for example. Swing arms 56 constructed of resilient material, e.g. a spring or the like, can optionally be attached to cap 54 to provide an auxiliary visual effect. Support members 57, 58 effect substantial rigid connection between enclosure 52 and vertical supports 32, 34 so as to stabilize it during periods of gusting winds or the like.

Referring more specifically to FIG. 2 wherein the operable components of the visual portion 50 are shown, it is seen that enclosure 52 houses a cylinder 60 and defines a space 62 between the walls of enclosure 52 and cylinder 60. Cap 54 is fixedly supported on rod 64 which is in turn axially disposed in cylinder 60. Cap 54 is arranged so that it rests upon housing 52 and covers space 62 and, thus, cylinder 60 when it is in the inactive position. On the end of rod 64 opposite cap 54, there is provided a plunger 66 which preferably is constructed of a pliable material such as rubber, or the like, and is sized so as to closely contact the interior walls of cylinder 60.

Preferably, a pulley 68 is journalled to rod 64 in the vicinity of plunger 66 and a second pulley 70 is journalled to the walls of cylinder 60 and is spaced a predetermined offset axial distance above pulley 68. A lenght of cable 72 is attached at one end to lever arm 44 and at the other end to a predetermined portion of cylinder 60, preferably in the area substantially opposite pulley 70. Cable 72 is thus threaded around pulleys 68, 70 intermediate the two attached ends to provide a mechanical lifting system for rod 64. Of course, an opening 74 is provided in enclosure 52 so as to enable cable 72 to be threaded around pulleys 68, 70.

As previously mentioned, the increased velocity of gas stream 16 impinging upon target plate 40 will effect responsive movement of lever arm 44 to the position generally shown in phantom line in FIGS. 1 and 2 due to the journalled attachment of bar 36 to upright supports 32, 34. Referring specifically to FIG. 2, it is seen that when lever arm 44 moves (arrow 76) to the position depicted in phantom line, cable 72 will reponsively cause pulley 68, and therefore, rod 64 to raise in cylinder 60. Such a raised position will be hereinafter referred to as the active position of the visual portion 50 and is generally depicted in phantom line throughout the various accompanying drawing figures.

When target plate 40 moves to its active position and, therefore, responsively causes rod 64 to be raised, plunger 66 is similarly and responsively raised in cylinder 60.

In order that rod 64 will be axially supported as it moves between the inactive and active positions as previously described, sleeve support 77 rigidly secured to cylinder 60 is provided so that rod 64 is slidably and reciprocably received therein. Additionally, supports 78 slidably and reciprocably received in conduits 79 may be provided to ensure an extra measure of stability to rod 64 in the active position. Supports 77 and 78 or the like may be required to stabilize cap 54 especially if the bird scaring device is to be utilized in an environment having gusting winds.

In a particularly preferred embodiment according to the present invention, means are provided which enable the visual portion 50 of the present invention to retain its active position for a predetermined time interval and to thereafter slowly return to its inactive position. A detailed cross-sectional view of such suitable means for retaining the visual portion 50 in the active position is shown in FIG. 3.

Plunger 66, constructed preferably of rubber or other pliable material, contacts the interior surfaces of cylinder 60 thereby providing an occlusive seal against the walls thereof. When plunger 66 is forceably raised in cylinder 60 in response to movement of target 40, the occlusive sealing effect causes ambient air to be drawn in through inlet conduit 80. Thus, one-way valve members 82, 84 are moved (arrow 86) to an open position thereby permitting the ambient air introduced through inlet conduit 80 to enter the interior cavity of cylinder 60 via ports 88, 90 associated with valve members 82, 84, respectively.

When plunger 66 has reached its maximum active position, the weight of cap 54 and rod 64 together establish a downward force upon the air which was initially drawn into the cavity of cylinder 60 as previously described. Thus, valve members 82, 84 are caused to return to their original closed position (noted in solid line in FIG. 3) thereby covering ports 88, 90, respectively. In such a manner, the egress of the air drawin into the cavity of cylinder 60 when plunger 66 moves to its operative position is prevented and this air becomes somewhat trapped therein to provide a cushion so as to maintain cap 54 in its active position.

A predetermined time interval to determine the rate at which cap 54 will return to the inactive position can be established by bleed valve 100. Bleed valve 100 permits one-way egress (arrow 102) of the ambient air which was initially drawn into the cavity of cylinder 60. The flow rate of ambient air through valve 100 can be controlled via an adjustable valve stem 104. Thus, depending upon the adjustment of valve 100 and the flow rate of air which it permits to escape the cavity of cylinder 60, cap 54 will be maintained in its active position for a predetermined time interval until the combined weight of the cap 54 and rod 64 forceably causes air to gradually escape through exit valve 100 thereby depleting the "cushion" of air in cylinder 60. Since valve stem 104 can be utilized to adjust the flow rate of air escaping from the cavity of cylinder 60, cap 54 can be caused to slowly return to its original inactive position to await activation once again due to gaseous stream 16 impinging upon target plate 40.

Auxiliary visual members can be provided according to the present invention which accent the visual scaring potential of the device according to the present invention. For example, strips of flexible streamers 106 can be fixedly attached to rod 64 so that when cap 54 is raised to its active position as described in detail above, the streamers 106 are caused to randomly move to enhance the scaring effect. When cap 54 returns to its inactive position, streamers 106 will be housed within the space 62 defined between enclosure 52 and cylinder 60.

Figure 4:
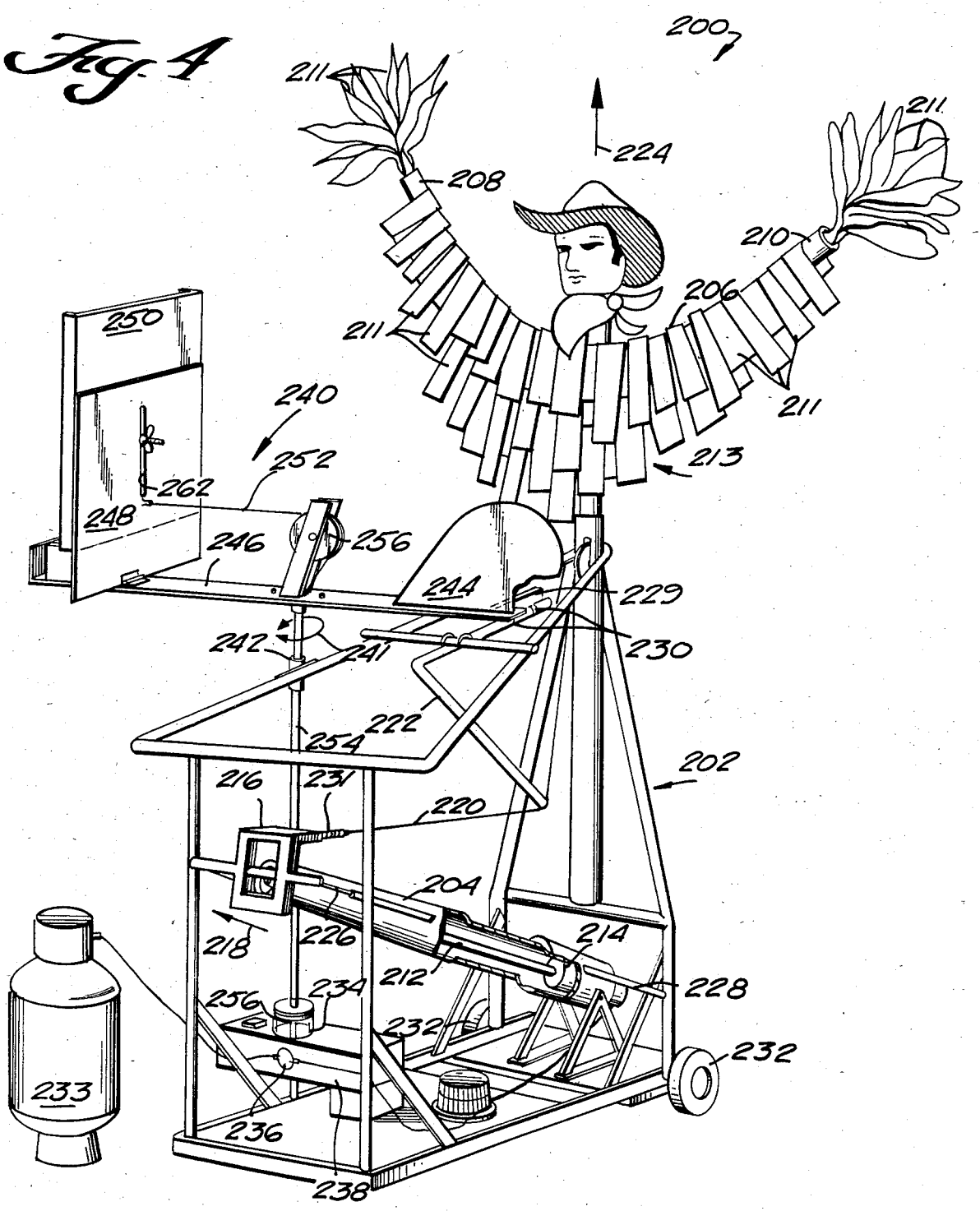
FIG. 4 is a perspective view, partially in section, of another exemplary embodiment according to the present invention.
Figure 6:
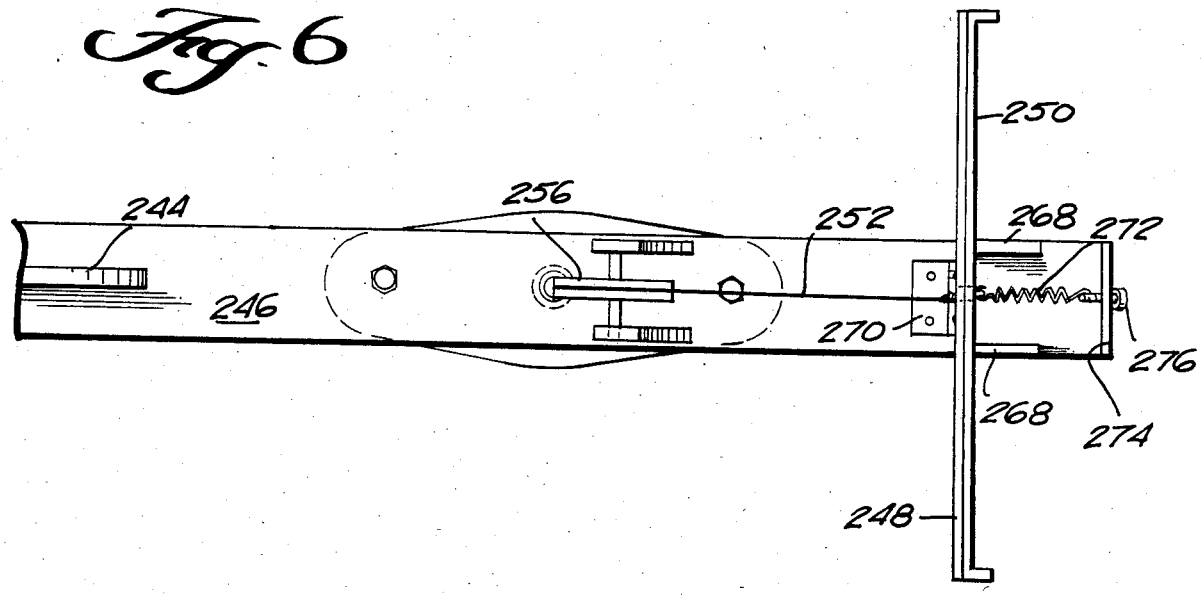
FIG. 6 is a plan view of the FIG. 5 wind sensor.
Figure 5:
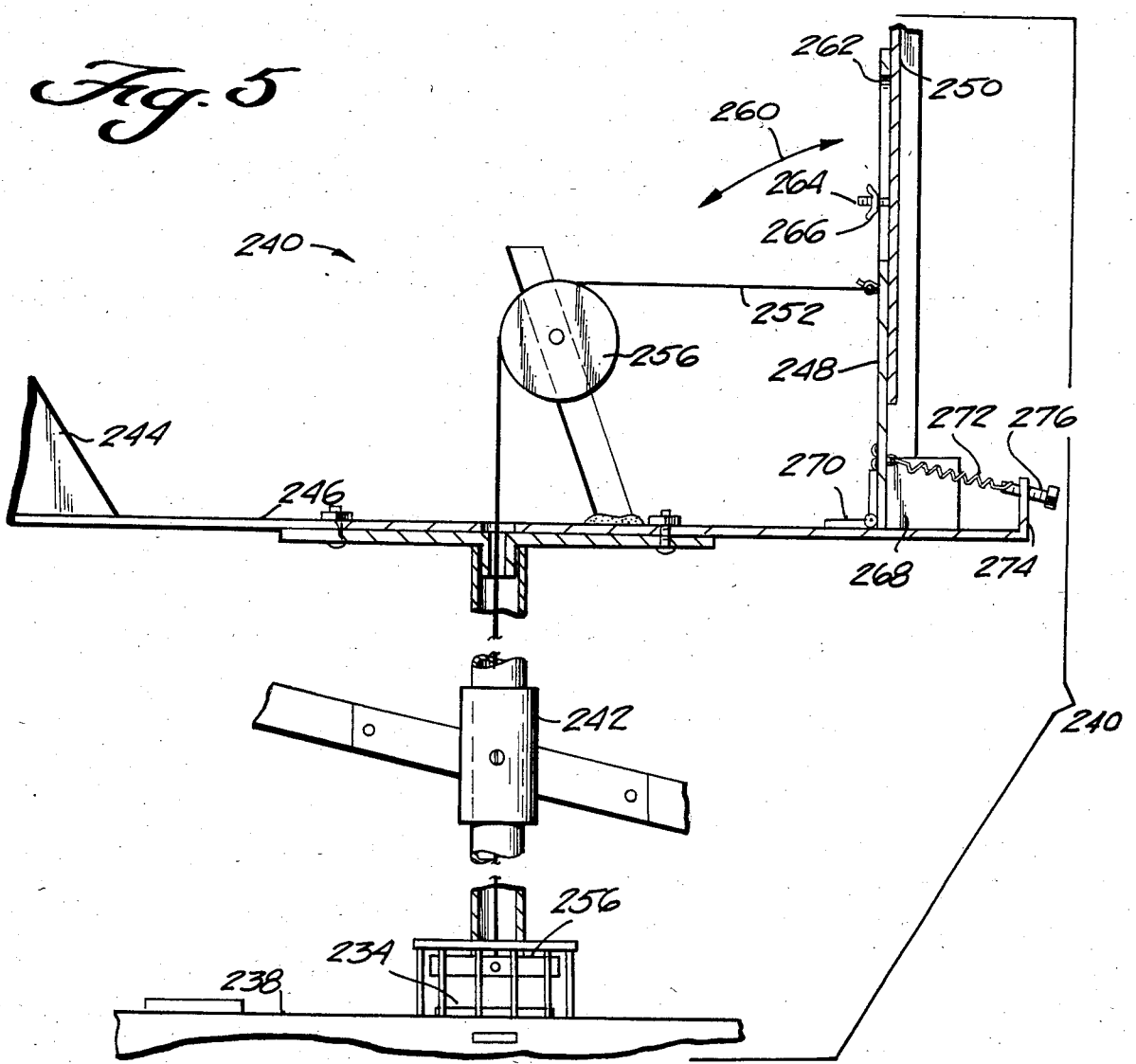
FIG. 5 is an elevational view of a wind sensor according to the present invention for sensing wind velocity and for disabling the present invention in the event a predetermined velocity is exceeded.

Another preferred exemplary embodiment according to the present invention can be seen by referrring to accompanying FIGS. 4-6. The device 200 is similar to device 10 described above in that a frame 202 is provided to support the propane gun 204 and the operative scarecrow figure 206. As can be appreciated, scarecrow 206 can be styled in any desired manner as, for example, a humanoid cowboy depicted in accompanying FIG. 4. The arms 208, 210 can be, for example, flexible plastic tubing so as to yield in response to the wind and also in response to the vertical reciprocal movement of scarecrow portion 206 when propane gun 204 is operated. Plural flexible streamers 211 of e.g. foil, plastic sheets or the like can also be provided to enhance the visual scaring effect upon birds. The device 200 preferably includes suitable mechanisms (not shown) to permit swivel movement of the torso portion 213 to further enhance the visual scaring effect upon birds.

The actuator mechanism according to the embodiment depicted in FIG. 4 generally comprises a rod 212 having an enlarged plunger portion 214 at the distal end thereof and being connected to actuator plate 216 at the proximal end thereof. Thus, when the gun 204 is operated, the combustion gases will bear against plunger portion 214 and thus enhance the forward displacement of actuator 216 (arrow 218 in FIG. 4). Thus, upon movement upon actuator plate 216 in the direction indicated by arrow 218 in FIG. 4, flexible cable 220 will pivot arm 222 and, due to the pulley system as previously described with regard to the FIG. 1 embodiment, the scarecrow portion 206 will be upwardly displaced to its active position (e.g. in the direction of arrow 224 in FIG. 4). Actuator plate 216 preferably includes members 226 which are slidably received within guide tubes 228 (only one pair of member 226 and guide tube 228 are evident in FIG. 4) so as to stabilize actuator plate 216 when it is displaced from its active position (as shown in solid line in FIG. 4) to it active position (e.g. when displaced in the direction of arrow 218). Pivot arm 222 is provided with a counter balancing weighted member 229 which is adjustable along the axial length of arm 222 so as to aid in the movement of torso portion 213 between its active and inactive positions and to compensate for the weight of the torso portion 213. Adjustable movement of weighted member 229 is achieved through the use of standard connecting U-bolts 230. Additionally, a recoil spring 231 operatively interconnects cable 220 and actuator plate 216 so as to aid the return of the rod 212 to its inactive position (e.g. as shown in FIG. 4).

A pair of wheels 232 can be provided on frame 202 so as to provide relative mobility to the device 200 and to permit the user to choose the desired location thereof.

Since birds typically roost at night, it is only necessary for the device of the present invention to operate only during the daylight hours so as to conserve the combustible fuel (e.g. preferably propane gas) contained in fuel container 233. According to the present invention, therefore, a photocell 234 is provided to sense the daylight hours. A solenoid valve 236 responsive to the photocell is provided so as to interrupt the flow of gas to gun 204 when the photocell 234 senses darkness thereby disabling the firing of gun 204 and, accordingly, disabling the vertical displacement of scarecrow portion 206. The solenoid valve 236 is connected to a drive transistor which operates in dependence with the photocell according to known techniques. The valve and the transistor will, of course, be powered by a battery (not shown) which is preferably housed within container 238.

Since the device 200 could be damaged by high winds, means are provided according to the present invention which disable the firing of gun 204 and thus, disable the vertical displacement of scarecrow portion 206 so as to minimize any damage which could occur due to such high wind velocities. According to the present invention, a wind sensor 240 is provided and is pivotally attached to frame 202 via sleeve 242 so that the wind sensor 240 can rotate (arrow 241) in response to the prevailing wind direction and, therefore, will always be facing into the prevailing wind. This pivotal movement is accomplished by providing a vane 244 on the frame 246 opposite to the wind sensing panels 248, 250. A flexible cable 252 is attached to sensing panel 248 and is directed into tube 254 by virtue of journalled pulley 256. The distal end of tube 254 is provided so as to be in close proximity to photocell 234 and, accordingly, at the distal end of cable 252, a covering plate 256 is attached. When sensing plates 248, 250 are rearwardly displaced (see arrow 260 in FIG. 5) the cover member 256 will register with photocell 234 thereby covering the latter and giving photocell 234 a false impression that nighttime is present to disable gun 204 by shutting off the fuel supply thereto as previously described.

The wind sensor can be set for any predetermined wind velocity by adjusting the overall surface area of plates 248, 250 which is exposed to the wind. Such adjustment is accomplished by providing relative vertical movement of plate 250 with respect to plate 248 by means of a elongated slot 262 defined in plate 248. Accordingly, a threaded bolt 264 rigidly fixed to plate 250 and slidably cooperating with slot 262 will permit relative vertical displacement between plates 248 and 250. Thus, by virtue of bolt 264 and nut 266, the desired overall surface area exposed to the oncoming prevailing wind can be selected. A stop member 268 is provided in advance of plate 248 so as to limit the extreme forward advance thereof while plate 248 is fixed to frame 246 by hinge 270 so as to permit relative hinged movement (arrow 260) of plates 248, 250.

In additon to the above-described adjustment means which can be provided with sensor 240 so as to adjust same for sensing a predetermined wind velocity and thus provide a threshold wind velocity for actuation, a biasing spring 272 can be connected between plate 248 and flange 274 by means of an adjustment bolt 276. Adjustment bolt 276 threadably cooperates with flange 274 so as to permit an adjustable range of biasing force exerted upon plates 248, 250 by spring 272. Spring 272 biases plates 248, 250 in a direction towards their extreme upright position (e.g. the extreme limit defined by stop member 268). Thus, since vane 244 will direct plates 248, 250 into the oncoming prevailing wind, the amount of tension provided by spring 272 will also help determine, in a preselected manner, the threshold velocity which is sufficient to overcome the biasing force of spring 272 and thus permit plates 248, 250 to be rearwardly hingedly moved (arrow 260) so as to disable the device of the present invention as previously described.

Accordingly, in addition to the surface area of plates 248, 250 which can be adjustably selected, the biasing force established by spring 272 will also contribute to the range of adjustment provided by sensor 240 so that virtually all desired wind velocities which could cause damage to the device of the present invention can be sensed and thus, the device can be disabled to prevent such damage.

Another embodiment of the bird scaring device (generally noted as 300 in FIGS. 7 and 8) generally comprises a cap member 302 which is adapted to fit onto the open end of barrel extension 304 which fits over the barrel proper 305 of gun 306. Extension 304 is preferably a cylinder constructed of rigid PVC material or the like. Gun 306 is preferably propane or LP gas actuated from a source thereof (not shown). A particularly preferred form of gun 306 can be obtained from B. M. Lawrence & Co., 351 California Street, San Francisco, Calif. 94104 and is marketed under the tradename "ZON".

Barrel extension 304 is preferably substantially vertically disposed and to this end a vertical support pipe 308 fixed to horizontal, ground-engaging stand members 310 are provided. Gun 306 can therefore be fixed to pipe 308 via mounting collars 312, 314.

Cap member 302 can be more clearly seen by referring to FIG. 8. As shown, cap member 302 includes a male portion 316 which closely fits within bore 318 of barrel extension 304. Guide pipe 320 is substantially coaxially disposed relative bore 318 and slidably houses control rod 322 to permit sliding movement thereof (arrow 324) between rest and operative positions. A weather gasket 326 of a suitable flexible sealing material (w.g. rubber or the like) is provided so as to safeguard the internal mechanisms of gun 306 from environmental conditions.

The lower end of control rod 322 includes a piton 328 of increased cross-sectional diameter to enhance the movement of rod 322 in response to combustion gases being emitted from barrel 305 at increased velocity. Thus, upon ignition of the combustible fuel (e.g. propane gas), the torso portion 330 will be moved to an active position by virtue of rod 322 being upwardly displaced in extension 304. Torso portion 330 includes arm members 332, 334 and a head member 336 so as to permit the user to decorate same in any desired humanoid manner.

To compensate for the weight of torso 330 (as decorated by the user) a weighted member 340 is operatively connected to control rod 322 by means of flexible cable 342 guided around journalled pulley 344. Thus, the weight of weighted member 340 can be selected so as to somewhat counter balance the inertial force exerted upon piston 328 and thus permit ease of movement of rod 322 in extension 304. Of course, the weight of member 340 should not exceed the combined weight of torso protion 330 otherwise return of torso portion 330 to its inactive position (as shown in FIG. 7) would be prohibited.

A further embodiment of the bird scaring device 400 of this invention is depicted in accompanying FIG. 9.

As shown, device 400 generally includes a housing tube 402 which, in its lower portion, defines a firing chamber 404 into which the barrel of a combustion fuel operated gun (not shown in FIG. 9 for clarity of presentation) can be inserted in a manner similar to that described above with regard to the embodiment of FIGS. 7 and 8. A stationary guide rod 406 is fixed to housing tube 402 by means of bolts 408, 410 so as to be disposed substantially concentric with respect to the interior cavity 412 of housing tube 402.

Sleeve tube 414 surrounds guide rod 406 so as to be slidably engaged therewith to permit for reciprocal rectilinear movement (arrown 416) between an inactive position (as shown in FIG. 9) and an active position wherein sleeve tube 414 is upwardly displaced. At the upper end 418 of sleeve tube 414, there is provided a mounting block 420 rigidly fixed to tube 414. Mounting block 420 provides the means by which humanoid figures can be operatively secured to tube 414, the humanoid "head" being generally depicted by dashed line 422 in FIG. 9. Thus, head 422 can be secured to mounting block 420 and in turn, to sleeve tube 414 by means of bolt 424. Arms 426, 428 of the humanoid figure are preferably opposingly mounted relative to one another and pivotally mounted to mounting block 420 by means of hinges 430, 432 so as to permit pivotal movement thereabout to enhance the scaring effect of arms 426, 428 when the humanoid figure is raised to an active position upon operation of device 400.

In order to more securely mount arms 426, 428 and to ensure that arms 426, 428 will not be damaged upon repeated operational cycling of device 400, motion dampers 434 are operatively engaged with arms 426, 428. Only damper 434 operatively connected with arm 426 is shown in FIG. 9 for clarity of presentation but the reader should appreciate that a similar damper is also operatively engaged with arm 428. Motion dampers 434 are fixed to mounting block 420 by means of extension rod 436.

A detailed cross-sectional elevational view of motion damper 434 is shown in greater detail in accompanying FIG. 10. As shown therein, damper 434 generally includes a damper housing 436 which defines a substantially cylindrical cavity 438 in which opposing compression springs 440, 442 are positioned. An actuator stem 444 having a flange 448 at one end thereof 15 operatively disposed between springs 440, 442 and includes at the other end a sleeve member 450 slideably surrounding a portion of arm 426. Sleeve member 450 thus permits arm 426 to slide relative thereto during pivotal movement of the latter so as to prevent unnecessary stress from being applied to the respective hinge 430. Aperture 452 defined in the upper wall 454 permits actuator stem 444 to be reciprocally moved relative to housing 436 in response to sleeve tube 414 being moved between active and inactive positions. Thus, actuator stem 444 will be upwardly displaced due to the inertia thereof when device 400 is operated thereby raising arm 426 and causing pivotal movement thereof about hinge 430. However, the biasing of spring 440 upon such upward movement of actuator stem 444 will downwardly bias stem 444 in cavity 438 whereupon spring 442 is contacted and acts as a damper for such downward movement to prevent damage of arm 426. In such a manner, the opposing biasing forces of springs 440, 442 act as shock absorbers while yet permitting pivotal movement of arms 426, 428 about hinges 430, 432 so that the enhanced scaring function thereof can be realized.

Referring again to FIG. 9, an important feature of the embodiment depicted therein resides in the use of spiral raceway 460 in operative association with guide rollers 462, 464 pivotally mounted to piston 466 at the lower end 468 of sleeve tube 414.

As shown in FIG. 11, representative guide roller 462 is pivotally mounted to the bottom surface 470 of piston 466 by means of pivot pin 472 which is fixed to mounting flanges 474, 476. Roller member 462 includes an axle 478 having a roller 480 journally mounted to the end thereof so as to be rotatable about the axis of axle 478. At the end opposite roller 480, axle 478 includes an aperture 482 which accepts pivot pin 472 so as to permit guide roller 462 to be pivotal about the axis defined by pivot pin 472. Suitable biasing means, for example torsion spring 484, is operatively associated with axle 478 so as to bias guide roller 462 into a substantially horizontal operative position.

The functional interaction of guide rollers 462, 464 and raceway 460 is schematically depicted in accompanying FIGS. 12a and 12b. Upon actuation of the combustible fuel operated gun (not shown), a stream of high velocity combustion gases is emitted therefrom and impinge upon piston 466 thereby driving piston 466 (and thus sleeve tube 414) upwardly so as to displace device 400 into an active position. Upon upward movement of piston 466 and sleeve tube 414, rollers 480 successively contact portions of spiral raceway 460 but, due to the pivotal mounting of guide rollers 462, 464 (only guide roller 462 is shown in FIGS. 12a and 12b for clarity of presentation), guide rollers 462, 464 will be downwardly pivotally displaced so that upward movement of piston 466 and sleeve tube 414 (noted by arrow 486 in FIG. 12a) will not be impeded. Once roller 480 clears that portion of spiral raceway 460 with which it contacts upon upward movement (arrow 486) of piston 466, the biasing means (e.g. torsion spring 484) will bias axle 478 and thus roller 480 into an operative, substantially horizontal position (noted in phantom line in FIG. 12a). In such a manner during upward travel of piston 466 in response to actuation of the combustible fuel operated gun (not shown), guide rollers 462, 464 will successively encounter portions of spiral raceway 460 but, due to the pivotal mounting and biasing of the respective axles, guide rollers 462, 464 will not impede such upward movement. Guide rollers 462, 464 will therefore successively be downwardly pivoted when first contacting a portion of the spiral raceway 460 but yet be biased into an operative position (phantom line in FIG. 12a) once the spiral raceway has been cleared.

When piston 466 and tube 414 reach the upper limit of travel in interior cavity 412, gravity will cause downward movement of piston 466 and sleeve tube 414 relative to guide rod 406 as shown in accompanying FIG. 12b. Upon such downward movement (arrow 488), guide rollers 462, 464 will contact the top guide surface 490 of spiral raceway 460 thereby causing rollers 480 to follow the downward spiral track of raceway 460. In such a manner, the downward relative rectilinear movement of piston 466 and sleeve tube 414 will be converted into rotary movement thereof (noted by arrow 492 in FIG. 12b) so that piston 466 and sleeve tube 414 will responsively rotate to enhance the visual scaring effect of the humanoid figure mounted thereto. Once piston 466 has reached its lower limit of travel (e.g. that condition shown in FIG. 9), the cycle can be repeated whereby upon upward movement of piston 466 (arrow 486 in FIG. 12a), device 400 can be displaced to its active position) whereas upon gravity-induced downward movement of piston 466 (arrow 488 in FIG. 12b) such linear downward movement is translated into rotary motion by virtue of the operative interaction of guide rollers 462, 464 with spiral raceway 460.

In order to absorb the energy imparted to piston 466 at its upper limit of travel to prevent damage thereof, resilient flanges 494 are fixed to the lower end of compression spring 496, the upper end of spring 496 being fixed to cap 498. In such a manner, when piston 466 contacts flanges 494, responsive displacement thereof against the biasing force of spring 496 will occur to absorb the energy imparted to piston 466 and thus prevent damage from occurring thereto. Additional shock absorbing functions can be provided by mounting a tension spring 499 between the lower end 468 of sleeve tube 414 and piston 466.

Thus, when consideration is given the preferred embodiments of the present invention, one will appreciate that it represents a distinct advance in the art of scaring birds. It is presently contemplated that once a device in accordance with this invention is placed in a field of growing crops, substantially maintenance-free, self-sustaining operation will result. Of course, periodic replenishment of the combustible gas will be necessary, but this chore is minimal when compared to the potential for significantly increased crop yields that the present invention could aid in realizing.

While an air gun of the type emitting a gaseous stream has disclosed herein, it should be appreciated that such disclosure represents a particularly preferred embodiment according to the present invention and, therefore, non-limiting thereto. As such, other state of the art actuators such as, electrical, pneumatic, or electro-mechanical actuators are conceivable.

Thus, while the present invention has been herein described in what is presently conceived to be the most preferred embodiments thereof, it will be understood to those in the art that many modifications may be made hereof within the scope of the present invention, which scope is to be accorded the broadest interpretation of the appended claims so as to encompass all equivalent structures, devices, or assemblies.

What is claimed is:

1. A bird scaring device comprising:
a frame;
visual means attached to said frame for reciprocal rectilinear movements between active and inactive positions for scaring birds; and
actuator means operatively connected to said visual means for moving said visual means between said inactive and active positions, said actuator means including means for ejecting a gaseous stream in a predetermined path and at increased velocity;
said visual means including target means disposed in said predetermined path so as to present a surface against which said gaseous stream impinges, said visual means moving from said inactive position and into said active position in response to impingement of said gaseous stream upon said surface of said target means;
said visual means including motion converting means for converting linear motion of said visual means into rotary motion in response to said visual means linearly moving from said active position and into said inactive position, wherein said motion converting means includes means defining a track to establish a spiral course in a fixed position relative to said visual means, and roller means attached to said visual means so as to be moveable therewith, said roller means engaging said track when said visual means moves from said active position to said inactive position along said linear path and for following said spiral course established by said track to responsively translate the linear movement of said visual means into rotary movement, whereby said visual means rotates upon movement from said active position to said inactive position;

said roller means including a pair of axles each having one and other ends, said axles being pivotally mounted to said visual means at said one end thereof so as to be pivotally movable between first and second position, and rollers journalled to respective said axles at said other end thereof.

2. A device as in claim 1 further comprising means for retaining said visual means in said active position for a predetermined period of time and for gradually returning said visual means to said inactive position.

3. A device as in claim 1 wherein said visual means is vertically disposed and includes:

means defining an elongated cylindrical cavity;

piston means disposed in said cylindrical cavity for reciprocal movement therein; and means connecting said piston means and said target means so that said piston means is raised to said active position in said cavity in response to said target means being moved to said operable position by virtue of said gaseous stream impinging upon said surface of said target means.

4. A bird scaring device comprising:

visual means reciprocally moveable between inactive and active positions along a linear path for scaring birds;

actuator means operatively connected to said visual means for moving said visual means along said linear path from said inactive position to said active position; and motion converting means operatively associated with said visual means for converting linear movement of said visual means into rotational movement in response to said visual means moving along said linear path from said active position to said inactive position, wherein said motion converting means includes means defining a track to establish a spiral course in a fixed position relative to said visual means, and roller means attached to visual means so as to be moveable therewith, said roller means for engaging said track when said visual means moves from said active position to said inactive position along said linear path and for following said spiral course established by said track to responsively translate the linear movement of said visual means into rotary movement, whereby said visual means rotate upon movement from said active position to said inactive position, said roller means including a pair of axles each having one and other ends, said axles being pivotally mounted to said visual means at said one end thereof so as to be pivotally movable between first and second positions, and rollers journalled to respective said axles at said other end thereof.

5. A bird scaring device as in claim 4 wherein said actuator means comprises means for ejecting a gaseous stream in a predetermined path at increased velocity.

6. A bird scaring device as in claim 1 or 4 wherein said roller means further includes biasing means to bias said axle into said first position.

7. A bird scaring device as in claim 6 wherein said biasing means is a torsion spring.

8. A bird scaring device as in claim 1 or 4 further comprising shock absorber means to absorb force of said visual means upon said visual means being moved to said active position to prevent damage thereto.

9. A bird scaring device as in claim 8 wherein said shock absorber means includes flange means for engaging said visual means at said active position and spring means exerting a bias on said flange means to counter a force exerted by said visual means upon engagement with said flange means and to effect yielding displacement of said flange means upon said engagement to thereby absorb said force.

10. A bird scaring device as in claim 1 or 4 further comprising arm means associated with said visual means for simulating the arms of a human, and motion damping means connected to said arm means to damp motion imparted to said arm means upon movement of said visual means between said active and inactive positions.

* * * * *